(No Model.)
E. A. STILES.
ANIMAL GRIP.
No. 445,663. Patented Feb. 3, 1891.
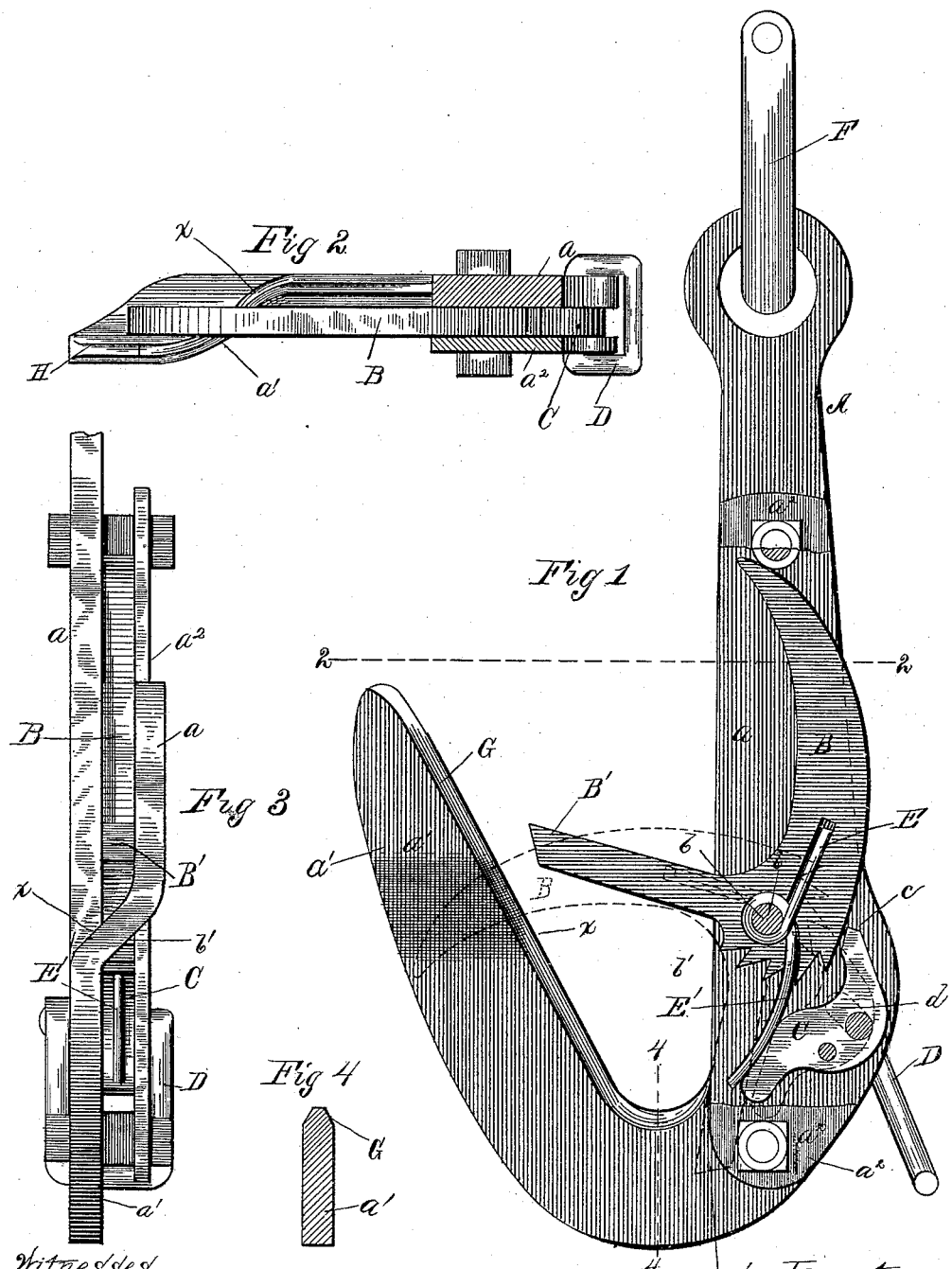

UNITED STATES PATENT OFFICE.

ELMER A. STILES, OF CHICAGO, ILLINOIS.

ANIMAL-GRIP.

SPECIFICATION forming part of Letters Patent No. 445,663, dated February 3, 1891.

Application filed October 22, 1890. Serial No. 368,953. (No model.)

*To all whom it may concern:*

Be it known that I, ELMER A. STILES, a citizen of the United States, residing at Chicago, in the county of Cook and State of Illinois, have invented certain new and useful Improvements in Animal-Grips; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to animal-grips particularly adapted to elevate hogs preliminary to slaughter; and it consists of a hook adapted to engage the leg of the animal and a device for automatically securing the hook to the leg, as hereinafter fully described.

In the accompanying drawings, Figure 1 represents a side elevation of my improved grip, a portion of the outer casing being removed to reveal the construction of the automatic retaining device. Fig. 2 is a cross-section on the line 2 2, Fig. 1, showing a plan view of some portions. Fig. 3 is a front view, and Fig. 4 is a cross-section on the line 4 4; Fig. 1.

In the slaughter of hogs the animal is suspended alive by one hind leg. Heretofore the commonly-employed means of securing the hog has been by a chain bearing a hook upon its end, the chain being passed around the leg and the hook upon its end caught in one of the links. Unless lifting strain is immediately applied to the chain, the animal is very apt to kick it loose from his foot. Difficulty also arises from this method of securing the hog, because the chain is liable to slip from the foot after the animal is elevated, and, furthermore, the conformity of the links is such that they seriously bruise the leg. It is found in practice that the boy who adjusts the chain to the animal's leg is apt, if working rapidly, to secure it above the knee or gambrel-joint, in which event the ham is always badly damaged by bruising. To overcome these difficulties I have invented an improved hook or grip, which I have fully shown in the accompanying drawings, in which—

A represents the main hook, comprising the main arm $a$ and the short arm $a'$, the latter being at such an angle to the former as to form a V. A dog or latch having the two arms B and B' is pivoted upon the main arm $a$ at $b$. The two arms of this latch are substantially at right angles. Upon the outer side of the shank or elbow of the latch is formed a ratchet $b'$.

A pawl C is pivoted to the main arm $a$ of the hook and has a pointed nose $c$, adapted to engage the teeth of the ratchet $b'$.

A spring E E' is wound upon the pivot-pin $b$, its end E being engaged in a longitudinal slot extending upwardly in the arm B of the latch, and its end E' extending downwardly, so as to bear against the heel of the pawl C. The tendency of the end E of the spring is to throw the latch back into the position shown by the solid lines in Fig. 1, the arm B' being across the mouth of the hook. The tendency of the end E' of the spring is to bring the nose of the pawl C in contact with the bow of the latch, whereby it engages the ratchet-teeth when the latch is brought into the position shown by the dotted lines, Fig. 1.

In adjusting the hook to the animal's leg the pressure of the latter upon the arm B' of the latch forces it downwardly toward the position indicated by the dotted lines in Fig. 1, and thereby the arm B is caused to follow the animal's leg as it enters the mouth of the hook, and is retained in this position by the action of the pawl C. The arm B is preferably formed upon a curve, as shown, so as to conform somewhat to the shape of the animal's leg.

It will be seen that if a small animal is caught the leg will pass well down to the bottom of the V, while in attaching the grip to a large animal the leg will be caught by the hook before it passes completely to the bottom of the jaw. In either event the operation of the latch is the same.

A cap or casing $a^2$ is secured upon the arm $a$ of the hook, so as to cover the latch and pawl and to serve as a bearing for one end of the pivot-pin $b$.

It will be seen that when the hog is suspended, although held securely by the V-shaped jaw of the hook, his foot will bear against the arm of the latch with some considerable force. The latch and its pivot-pin and casing being preferably light, I bend or offset the arm $a'$ of the hook laterally near its point, as shown at $x$, so that the end of the arm B will fall behind it and bear against it when under pressure, as described. In this way there is no material strain brought upon the weaker parts. The arm B' is short enough to clear the curve $x$ in its movement.

The offset need not be introduced if the grip is to be used only upon small hogs or if the parts are made heavy enough to withstand the strain, and I do not desire to be limited to this form of construction.

The bolts or rivets for securing the casing $a^2$ to the hook are so located as to serve as stops for the latch, as shown in Fig. 1.

A link D is attached to the pawl C for the purpose of releasing it from the ratchet $b'$, suitable apertures $d$ being formed in the hook A and in the cap or casing $a^2$ to accommodate said link, as indicated by dotted lines.

In operation, the grip having been secured to a suspending-tackle by means of the link F and caught upon the animal's leg, as indicated, the animal is elevated in the usual manner and conveyed to a point above the scalding-vat. A hook is now caught into the link D, and the suspending-tackle is slipped off the end of the track upon which it has been carried in the usual manner, and the animal is permitted to drop. The strain now falling upon the link D, the pawl C is disengaged from the ratchet $b'$, and by the action of the spring E the latch is thrown upwardly, and the hook A is thereby disengaged from the animal's leg by the action of the arm B' and is again ready for use.

To prevent the hook slipping on the leg, its biting-edges are beveled, as shown in Fig. 4, but not brought to a cutting-edge.

It will be seen that my grip is automatic in its action and release and is self-adjusting, being adapted to use on hogs of any size.

I am aware that animal-grips have been made in U form and with a two-arm latch, and I do not broadly claim a hook having such an appendage.

What I claim as my invention, and desire to protect by Letters Patent, is—

1. In an animal-grip, the combination, with a V-shaped hook having its short arm laterally curved or offset, of a two-arm latch, substantially right-angled, pivoted at its elbow to the main arm of the hook, a ratchet on the latch, a pawl for engaging the ratchet, a spring for throwing back the latch and controlling the pawl, and a link for releasing the pawl, substantially as described, and for the purposes set forth.

2. In an animal-grip, the combination, with a V-shaped hook, of a two-arm latch, substantially right-angled, pivoted at its elbow to the main arm of the hook, a ratchet on the latch, a pawl for engaging the ratchet, a spring for throwing back the latch and controlling the pawl, and a link for releasing the pawl, substantially as described, and for the purposes set forth.

In testimony whereof I affix my signature in presence of two witnesses.

ELMER A. STILES.

Witnesses:
M. E. FERGUSON,
JOHN C. WEBER.